United States Patent [19]

Takahashi

[11] Patent Number: 5,000,530
[45] Date of Patent: Mar. 19, 1991

[54] OPTICAL MULTIPLEXING/DEMULTIPLEXING DEVICE WITH MULTIPLE PORTS

[75] Inventor: Mitsuo Takahashi, Matsudo, Japan

[73] Assignee: Seikoh Giken Co., Ltd., Matsudo, Japan

[21] Appl. No.: 522,054

[22] Filed: May 11, 1990

[30] Foreign Application Priority Data

Jan. 26, 1990 [JP] Japan .................................. 2-16972

[51] Int. Cl.⁵ .......................... G02B 6/26; G02B 6/42; G02B 6/28; G02F 1/00
[52] U.S. Cl. .............................. 350/96.15; 350/96.16; 350/96.20; 455/610
[58] Field of Search ............... 350/96.15, 96.16, 96.20; 455/608–612

[56] References Cited

U.S. PATENT DOCUMENTS

| | | | |
|---|---|---|---|
| 4,449,783 | 5/1984 | Witte | 350/96.16 |
| 4,556,279 | 12/1985 | Shaw et al. | 350/96.15 |
| 4,732,449 | 3/1988 | Fan | 350/96.18 |
| 4,900,118 | 2/1990 | Yanagawa et al. | 350/96.15 |

Primary Examiner—Akm Ullah
Attorney, Agent, or Firm—Spencer & Frank

[57] ABSTRACT

An optical multiplexing/demultiplexing device with multiple ports. A plurality of pairs of V-grooves are provided in parallel on each substrate made of invar or the same type of material as the optical fibers with the same linear expansion coefficient so as to store the optical fibers. A pair of substrates having the symmetrical structure are assembled to form a plurality of optical multiplexing/demultiplexing circuits. A pair of trenches are provided on each substrate in parallel with and on both sides of the V-grooves. Optical fiber terminals led from the respective V-grooves are connected to form a $1 \times n$ (n: an integer $\geq 2$) star coupler structure.

3 Claims, 3 Drawing Sheets

OPTICAL MULTIPLEXING/DEMULTIPLEXING DEVICE WITH MULTIPLE PORTS

BACKGROUND OF THE INVENTION

The present invention relates to the structure of the optical multiplexing/demultiplexing device to multiplex or demultiplex the optical signals in the optical fiber communication circuits, and more particularly to the tree-coupler or star coupler structure of the optical multiplexing/demultiplexing device of multiple-port type where a plurality of optical output signals can be obtained when a single optical signal is input, or where one out of a plurality of optical signals can be input to send it to a single optical signal terminal.

Various types of optical multiplexing/demultiplexing devices with multiple input/output ports have been proposed for the optical fiber communications, and these devices are conventionally used to multiplex or demultiplex the optical signals in the optical fiber communications.

Many of them are of 2 by 2 matrix where two ports receive the inputs and the other two ports send the outputs since the 2 by 2 matrix type is easy to fabricate. When a system requiring a "m" by "n" matrix (m>2 and n>2) is built, two or more optical multiplexing/demultiplexing devices with 2 by 2 input/output ports are being used corresponding to the system size. One of them is the optical multiplexing/demultiplexing device wherein 2 by 2 input/output ports are built on a pair of substrates by polishing a pair of optical fibers on a pair of substrates before they are aligned.

FIGS. 3(a) and 3(b) show exploded cross-sectional views of a conventional optical multiplexing/demultiplexing device. FIG. 3(a) being shown cut across the optical axis thereof, and FIG. 3(b) being shown cut along the optical axis thereof.

Referring to FIGS. 3(a) and 3(b), the structure of the conventional optical multiplexing/demultiplexing device will be described hereafter.

In FIGS. 3(a) and 3(b), V-grooves 33 and 34 are trenched at the center on one sides of quartz glass substrates 31 and 32, respectively. Optical fibers 35 and 36 are installed into V-grooves 33 and 34, respectively. These optical fibers are fastened there by adhesives. Thereafter, clads 39 and 40 of optical fibers 35 and 36 are scrubbed off by polishing the optical fibers into the direction which is in parallel with the grooves 33 and 34 until cores 37 and 38 of the optical fibers 35 and 36 are just to be exposed, respectively. Substrates 31 and 32 are assembled in such a manner that the surface of substrate 31 on which V-groove 33 storing both core 37 and clad 39 is trenched faces the surface of substrate 32 on which V-groove 34 storing both core 38 and clad 40 is trenched and that cores 37 and 38 are aligned, and thereafter these substrates are fastened by setscrews or adhesives.

Optical fiber cores 38 and 39 can receive or send the optical power one another in the evanescent mode at a predetermined ratio of the sending to receiving powers. If the gap between the centers of cores 37 and 38 of the respective optical fibers is trimmed by fine adjustment mechanism, the ratio of the sending to receiving powers can be set more precisely than that which is attained by any other type of the conventional optical multiplexing/demultiplexing device. In addition, the optical multiplexing/demultiplexing device shown in FIGS. 3(a) and 3(b) provides higher reliability and stability against shock and vibration, and exhibits the excellent performance over the wide temperature range.

The optical performance, however, depends on the accuracy of the work finished to construct the V-groove trenched on the quartz glass substrate. The quartz glass substrate has a linear expansion coefficient which resembles that of the optical fiber made of quartz, and thus an abrupt temperature change applies to the optical fiber such few tensile stress that it cannot break the optical fiber. Contrarily, the quartz glass substrate can be finished in three dimensions only by scrubbing the quartz glass substrate with abrasives. The quartz glass substrate can easily be broken by thermal shock during the work to fabricate it because of its hardness and brittleness, and V-grooves cannot be fabricated by scrubbing the quartz glass substrate with abrasives in most cases.

It is also known by a person skilled in the art that the use of the photoetching techniques which are generally used to work the quartz glass is limited in making a two-dimensional pattern with shallow trenches.

This type of optical multiplexing/demultiplexing device which is actually built on a pair of quartz glass substrates by scrubbing the quartz glass substrates with abrasives or by etching them in an etchent is quite a few in examples because of its difficulty in precisely making V-grooves on a pair of quartz glass substrates.

The conventional optical multiplexing/demultiplexing device with multiple input and output ports is thus made of a plurality of 2×2 optical multiplexing/demultiplexing devices, each having 2-input and 2-output ports, corresponding to the numbers of input and output ports required.

FIG. 4 shows an example of the structure of the optical multiplexing/demultiplexing device with one-input and 8-output ports (or 1 by 8 matrix).

Optical fibers coming out of seven optical multiplexing/demultiplexing devices 6a through 6g, each having 2-input and 2-output ports (or 2 by 2 matrix), are as shown in FIG. 4 connected together, to form a 1 to 8 star coupler, at points C1 through C6 by arc discharge alloying or through optical connectors in such a manner that device 6a is connected to devices 6b and 6c via points C1 and C2, device 6b is connected to devices 6d and 6e via points C3 and C4, and that device 6c is connected to devices 6f and 6g via points C5 and C6.

An optical input signal at input port P is divided and fed to eight output ports P1 through P8. For dividing an input signal into 16 output signals, 15 devices are to be used. For dividing an input signal into 32 output signals, 31 devices are to be used. For dividing an input into 64 output signals, 63 devices are to be used.

As described heretofore, a greater number of optical multiplexing/demultiplexing devices of 2 by 2 matrix type are required to build an optical multiplexing/demultiplexing device of "m" by "n" matrix type (where m>2 and n>2). The small-size, light-weight version is difficult to be built, if a greater number of input/output ports is required, because of its complexity in structure. Since the device size increases as the number of ports increases, the reliability and stability against shock and vibration go low with the number of ports.

The objective of the invention is to present an improved small-size version of the optical multiplexing/demultiplexing device having multiple ports which is fabricated by the precise work of the V-grooves wherein optical fibers are installed on each substrate, and which is fabricated in accordance with the thermal expansion compensation rule to minimize the possibility of breaking of the optical fibers due to the difference in the linear expansion coefficient between the optical fibers and substrates.

SUMMARY OF THE INVENTION

The optical multiplexing/demultiplexing device having multiple ports, which is built in accordance with the present invention, provides a plurality of V-grooves which respectively correspond to a plurality of optical fibers passing through the V-grooves in parallel one another at equal distances in such a manner that a pair of optical fibers installed in a pair of V-grooves which are faced one another on a pair of substrates which are symmetrically arranged one another with respect to the plane intersecting the pair of substrates, when one contacts the other in such a manner that the pair of V-grooves are aligned in position, wherein each optical fiber is fastened to each V-groove by adhesives, wherein the clad of each optical fiber is scrubbed off in parallel and together with the inner surface of each substrate whereon the V-grooves are trenched, to such an extent that the core of each optical fiber is just to be exposed, and wherein a pair of optical fibers are mounted on the substrate in such a manner of alignment that the polished surface of one optical fiber contacts the other optical fiber within the corresponding groove arranged in front of and aligned to the mating other groove; and a plurality of optical multiplexing/demultiplexing circuits on the pair of substrates, wherein an optical signal is input to or output from first optical fiber terminal on first side of first optical multiplexing-/demultiplexing circuit, a pair of optical fiber terminals on second side of the first optical multiplexing/demultiplexing circuit are connected through the respective first terminals on the second sides of second and third optical multiplexing/demultiplexing circuits to the corresponding two pairs of optical fiber terminals on the respective first sides of the second and third optical multiplexing/demultiplexing circuits, the two pairs of optical fiber terminals on the respective first sides of the second and third optical multiplexing/demultiplexing circuits are connected through the respective first optical fiber terminals on the first sides of fourth through seventh optical multiplexing/demultiplexing circuits to four pairs of optical fiber terminals on the respective second sides of the fourth through seventh optical multiplexing/demultiplexing circuits, and so on. This mode of connections continues until the number of optical fiber terminals becomes the designated value. The connections between the respective optical fiber terminals are actualized by means of arc discharge alloying or by the use of the respective optical connectors.

The pair of substrates are made of invar alloy consisting of nickel (36%) and iron (64%), or sintered alloy having the same constituents, which has lower linear expansion coefficient.

Each substrate provides a pair of trenches for storing dust produced by scrubbing the metals of the substrate in parallel with and on both sides of a plurality of V-grooves for storing a plurality of optical fibers.

In accordance with the present invention, the optical multiplexing/demultiplexing device can be made compact and light in weight, and V-grooves to store a plurality of optical fibers can precisely be finished for precisely scrubbing a plurality of optical fibers at a time. In addition, the chance of breaking the optical fibers due to difference in linear expansion coefficient between the optical fibers and the substrate may be minimized.

Furthermore, the malfunctioning of the scrubbed optical fiber surfaces in the optical multiplexing/demultiplexing device due to the dust of metal produced from the substrate material during the scrubbing of the optical fiber surface will be eliminated in greater degree and the quantity of metal rubbed off from the substrate material will also be reduced. The elimination of the malfunctioning of the device may cause the optical multiplexing/demultiplexing device to have the improved performance. The reduction of the quantity of metal rubbed off may cause the processing time of finishing the multiplexing/demultiplexing device to shorten.

PREFERRED EMBODIMENT

The present invention will be described hereafter referring to the attached drawings.

Figure 1A:
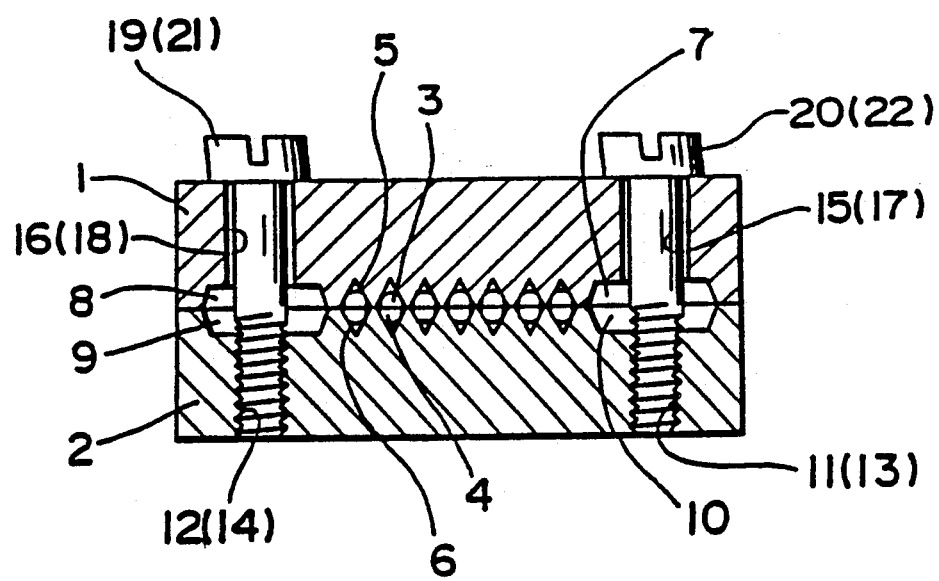
FIG. 1(a) is an exploded cross-sectional view of an embodiment of an optical multiplexing/demultiplexing device cut across the optical axis thereof.
Figure 1B:
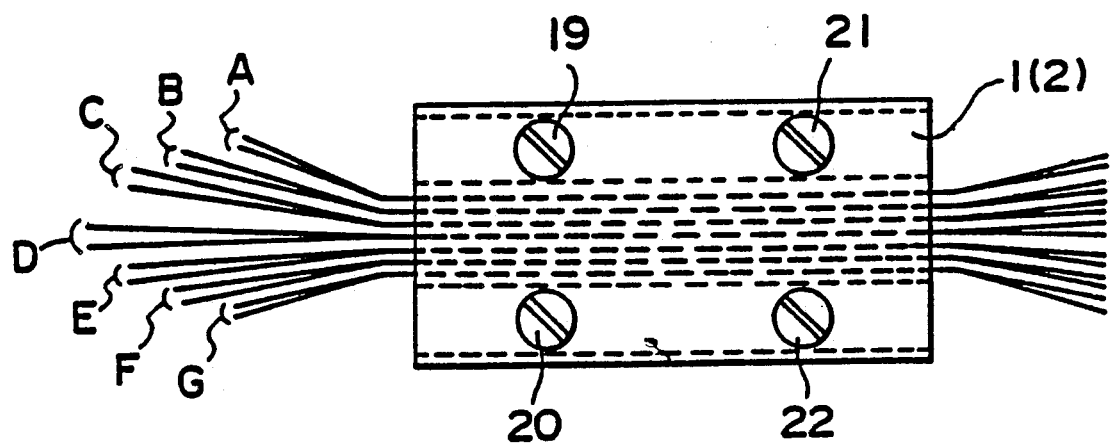
FIG. 1(b) is an exploded top view of the embodiment of the optical multiplexing/demultiplexing device shown in FIG. 1(a).

FIG. 1(a) shows an exploded cross-sectional view of the optical multiplexing/demultiplexing device cut across the optical axis, and FIG. 1(b) shows a top view of the optical multiplexing/demultiplexing device, respectively. The optical multiplexing/demultiplexing device shown in FIGS. 1(a) and 1(b) is built in accordance with the present invention to form a 1×8 matrix array structure.

Seven pairs of V-grooves identified by numbers 5 and 6 are trenched in parallel onto the respective inner surfaces of substrates 1 and 2 which are made of invar alloy, and optical fibers identified by numbers 3 and 4 are installed into the respective pairs of V-grooves identified by numbers 5 and 6. These optical fibers are fastened to the V-grooves by means of adhesives.

The inner surfaces of substrates 1 and 2 whereon optical fibers identified by numbers 3 and 4 are installed in and fastened to the V-grooves identified by numbers 5 and 6 are scrubbed off by polishing there in parallel and together with the clads of optical fibers identified by numbers 3 and 4 to such an extent that the cores of the optical fibers are just to be exposed. The inner surfaces of V-grooves 5 and 6 are thus finished. While the inner surfaces of V-grooves 5 and 6 are being polished, the dust produced by scrubbing the optical fibers together with the substrates 1 and 2 can be stored in trenches 7 through 10 on both sides of a set of seven V-grooves identified by numbers 5 and 6, on the inner surfaces of substrates 1 and 2 whereon V-grooves are provided. Thus, scratches caused by the dust produced by scrubbing the optical fibers together with the substrates 1 and 2 can be eliminated.

Through holes 15 through 18 are provided to pass setscrews 19 through 22 through at the bottoms of trenches 7 and 8 on substrate 1, and tapped holes 11 through 14 are provided to accept setscrews 19 through 22 at the bottoms of trenches 9 and 10.

Polished surfaces of the respective optical fibers installed in V-grooves of polished substrates 1 and 2 are faced to be aligned each other, and then fastened one another to constitute a device structure by setscrews 19 through 22 accepted by taps 11 through 14 passing through holes 15 through 18 in such a manner that the cores of the optical fibers installed in a set of V-grooves can contact the mating cores of the mating optical fibers installed in the corresponding set of V-grooves so that the optical power passing through a certain optical fiber branches into the mating optical fiber.

FIG. 1(b) shows the top view of the multiplexing-/demultiplexing device before optical fibers which have been installed into V-grooves of the device are connected to function.

Figure 2:
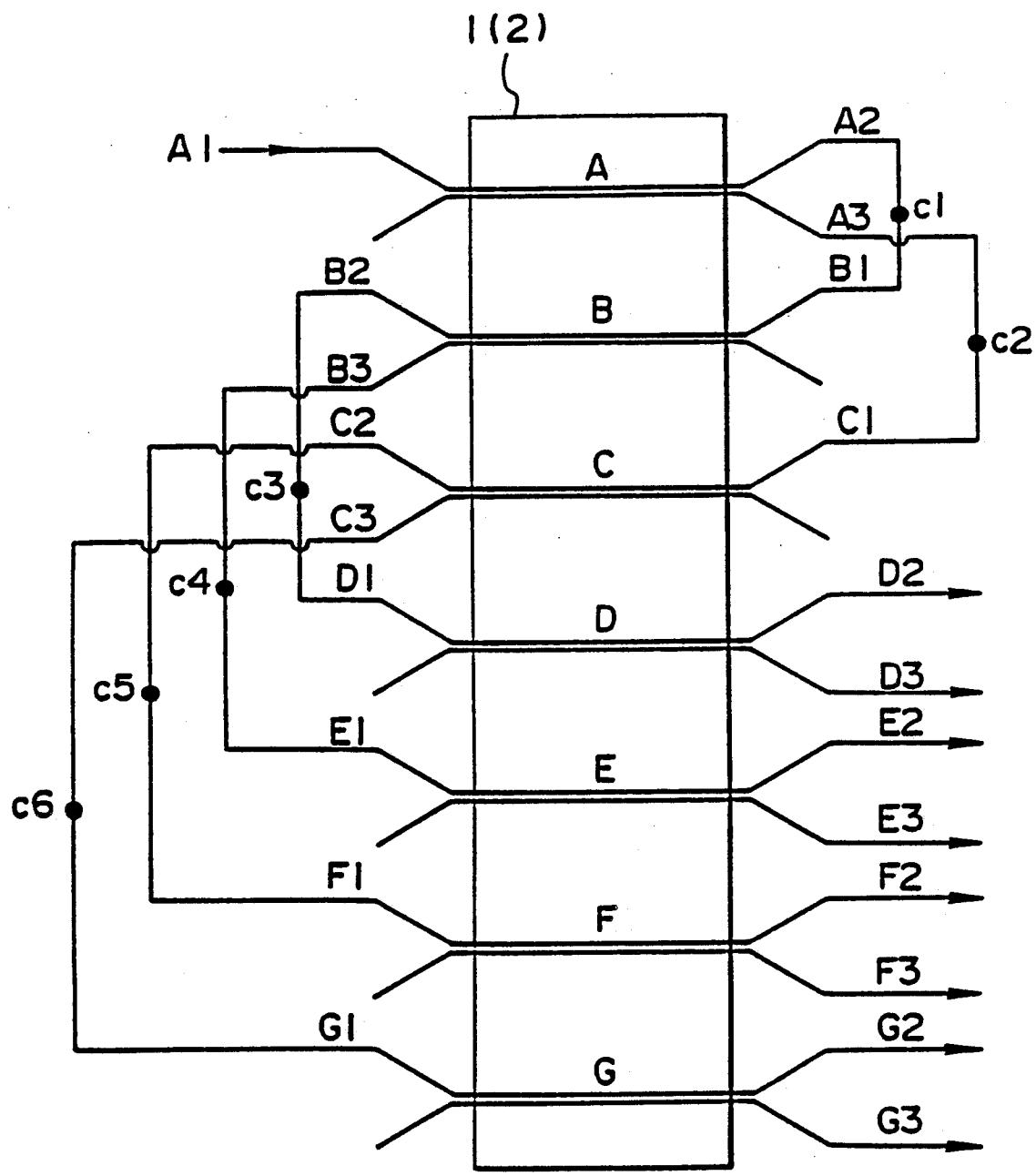
FIG. 2 is a schematic diagram of the optical multiplexing/demultiplexing device according to the present invention wherein a plurality of optical fibers are connected together to multiplex or demultiplex the optical signals.
Figure 3A:
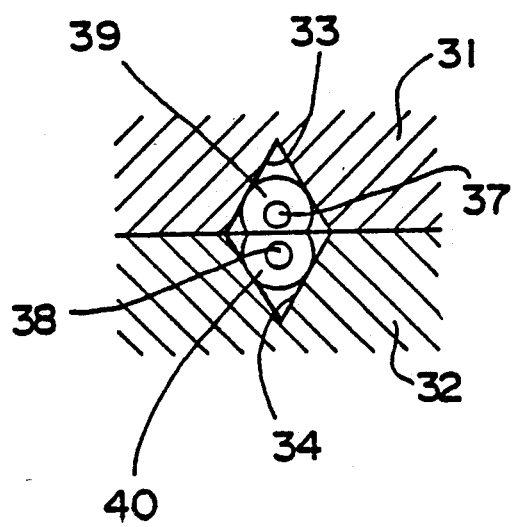
FIG. 3(a) is a cross-sectional front view of a conventional pair of optical fibers aligned to be attached one another in a pair of V-grooves cut across the optical axis.
Figure 3B:
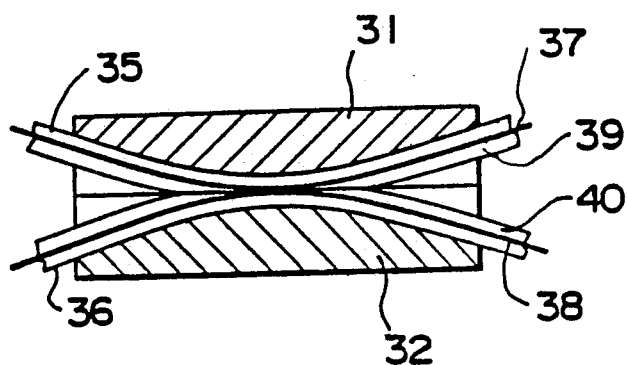
FIG. 3(b) is a cross-sectional side view of the pair of optical fibers aligned to be attached one another in the pair of V-grooves cut along the optical axis shown in FIG. 3(a).
Figure 4:
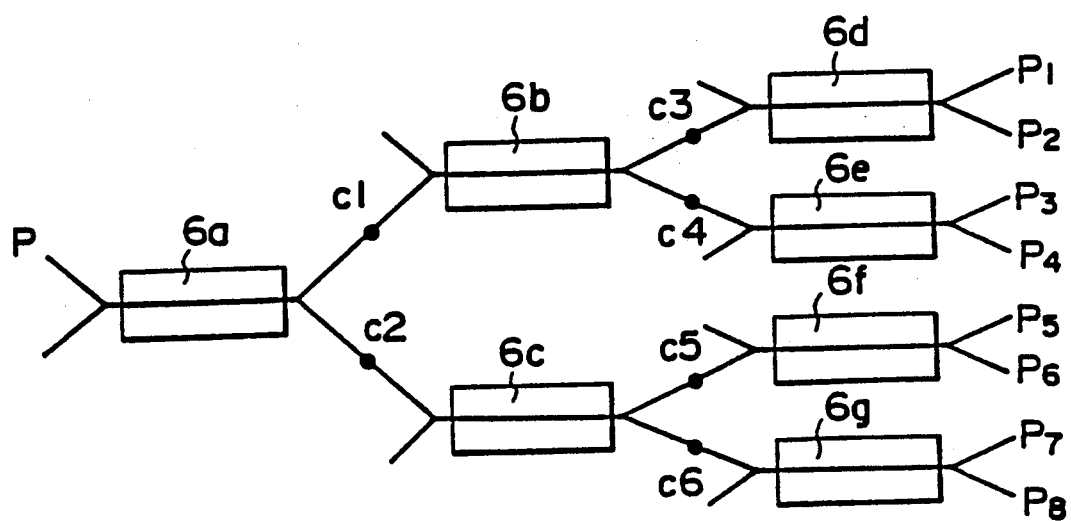
FIG. 4 is a schematic diagram of the conventional optical multiplexing/demultiplexing devices connected to constitute a 1×8 array structure.

FIG. 2 shows the schematic diagram of the optical multiplexing/demultiplexing device illustrating the interconnection of the optical fibers installed into V-grooves of the device shown in FIGS. 1(a) and 1(b).

Seven pairs of V-grooves, "A" through "G", in the optical multiplexing/demultiplexing device have seven pairs of optical fibers in the lefthand side of the drawing and other seven pairs of optical fibers in the righthand side of the drawing.

Although an optical fiber in the lefthand side of the first pair of V-grooves labeled "A" is unrised as shown in FIG. 2, it is preferred for the edge of that optical fiber to be finished by polishing its edge surface at eight degrees inclined with respect to the plane perpendicular to its optical axis so that the optical power going through the optical fiber might not be reflected at the edge of the optical fiber.

The optical power incident on the optical fiber at port A1 is transmitted to ports A2 and A3.

The optical powers appearing at ports A2 and A3 are input to ports B1 and C1, respectively. The optical powers appearing at ports B1 and C1 are transmitted to ports B2, B3, C2 and C3, and then sent to four optical fibers. The optical powers appearing at ports B2, B3, C2 and C3 are input to ports D1, E1, F1 and G1. The optical powers appearing at ports D1, E1, F1 and G1 are transmitted to ports D2, D3, E2, E3, F2, F3, G2 and G3, and then sent to eight optical fibers.

The edges of the respective optical fibers are connected together as shown in FIG. 2, and connecting points c1 through c6 are joined by means of arc discharge alloying or through optical connectors.

For the demultiplexer of greater than eight outputs, whether the scrubbing of the substrate is required, the number of V-grooves is increased, and whether two or more optical multiplexing/demultiplexing devices of eight outputs are connected in series are the manufacturer's choice on the bases of the production and maintenance costs. For instance, eight optical multiplexing-/demultiplexing devices consisting of $1 \times 8$ matrix array are used to construct a $1 \times 64$ matrix array structure although 63 optical multiplexing/demultiplexing devices consisting of $2 \times 2$ matrix array are required to be used for the same purpose.

The optical multiplexing/demultiplexing device with a greater number of optical fibers installed therein has the following disadvantages unless trenches are provided on both sides of a set of V-grooves in each substrate.

The inner surface of each substrate will be burned by scrubbing the inner surface for a long time since a device having a greater number of input/output ports requires a long time to finish the inner surface of each substrate. The burning generally increases the optical power loss at the interface between mating optical fiber cores contacted one another since the quantity of the dust produced by the scrubbing is greater than that which is produced during the fabrication of a conventional $2 \times 2$ matrix array device. In addition, the dust may cause scratches on the optical fiber core surfaces of a conventional device.

The optical multiplexing/demultiplexing device built in accordance with the present invention, however, has a set of trenches in each substrate so that the dust may be stored in the trenches. In addition, this type of optical multiplexing/demultiplexing device consisting of a $1 \times 8$ matrix array structure can be fabricated by the process which requires almost the same time as the process of fabricating a $2 \times 2$ matrix array device because the trenches which have been provided in each substrate can store the dust and also reduce the time for scrubbing the substrate, and this reduction of processing time prevents the inner surface of each substrate mounting a set of optical fibers in a set of V-grooves against the burning which may cause the optical power loss.

The present invention will be summarized as follows:

As described above, the optical multiplexing/demultiplexing device constructed by the production process, wherein the clads of the optical fibers installed in the substrate are scrubbed to finish the optical branches, in accordance with the present invention provides a plurality of optical multiplexing/demultiplexing circuits on a pair of substrates corresponding to the number of multiplexing or demultiplexing. This feature reduces the size and weight and the reduction is enhanced as the number of multiplexing or demultiplexing increases. The size reduction improves the performance of the device against shock and vibration, and it cuts the production cost.

The substrate used to install a plurality of optical fibers into the V-grooves thereof which have been finished precisely in the present invention is made of invar or super invar alloy which has the same linear expansion coefficient as the optical fibers made of quartz crystal, thereby improving at $\pm 1$ $\mu$m or less the reproducibility of dimensions obtained by polishing the substrate together with the optical fibers, although the substrate in the conventional optical multiplexing-/demultiplexing device uses quartz crystal as a starting material which is rather difficult for a craftman to be finished precisely.

The mechanical strength against the thermal stress imposed on the optical fibers due to the difference of the expansion coefficient between the optical fibers and substrate when the ambient temperature changes is almost the same as that for which the substrate is made of quartz glass.

The trenches provided in the substrate so as to store the dust mainly consisting of metal particles produced by scrubbing the substrate together with the optical fibers reduce the processing time of scrubbing the substrate together with the optical fibers, and they improve the performance of the optical multiplexing/demultiplexing device. For instance, in the prototype, the burning of the inner surface of the substrate where the optical fiber cores are just exposed was greatly reduced and scratches on the inner surface thereof were greatly reduced.

What is claimed is:

1. An optical multiplexing/demultiplexing device with multiple ports, consisting of a substrate and a plurality of optical fibers;
    wherein the substrate provides a plurality of V-grooves which respectively correspond to a plurality of optical fibers passing through the V-grooves in parallel one another at equal distances in such a manner that a pair of optical fibers installed in a pair of V-grooves which are faced one another on the pair of substrates which are symmetrically arranged one another with respect to the plane intersecting the pair of substrates, when one contacts the other in such a manner that the pair of V-grooves are aligned in position, wherein each optical fiber is fastened to each V-groove by adhesives, wherein the clad of each optical fiber is scrubbed off in parallel with the inner surface of each substrate whereon the V-grooves are trenched, to such an extent that the core of each optical fiber is just to be exposed, and wherein a pair of optical fibers are mounted on the substrate in such a manner of alignment that the polished surface of one optical fiber contacts the other within the corresponding groove arranged in front of and aligned to the mating other groove; and
    a plurality of optical multiplexing/demultiplexing circuits on the pair of substrates, wherein an optical signal is input to or output from first optical fiber terminal on first side of first optical multiplexing-/demultiplexing circuit, a pair of optical fiber terminals on second side of the first optical multiplexing/demultiplexing circuit are connected through the respective first terminals on the second sides of second and third optical multiplexing/demultiplexing circuits to the corresponding two pairs of optical fiber terminals on the respective first sides of the second and third optical multiplexing/demultiplexing circuits, the two pairs of optical fiber terminals on the respective first sides of the second and third optical multiplexing/demultiplexing circuits are connected through the respective first optical fiber terminals on the first sides of fourth through seventh optical multiplexing/demultiplexing circuits to four pairs of optical fiber terminals on the respective second sides of the fourth through seventh optical multiplexing/demultiplexing circuits, and the connections continue until the number of optical fiber terminals becomes the designated value; and
    the connections between the optical fiber terminals are actualized by means of arc discharge alloying or by the use of optical connectors.

2. An optical multiplexing/demultiplexing device with multiple ports as claimed in claim (1), wherein the pair of substrates are made of invar alloy consisting of 36% of nickel and 64% of iron, or sintered alloy having the same constituents, which has lower linear expansion coefficient.

3. An optical multiplexing/demultiplexing device with multiple ports as claimed in claim (1), wherein each of the substrates has a pair of trenches, each of which stores the dust produced by scrubbing the metals of the substrate together with a plurality of optical fibers, in parallel with and on both sides of a plurality of V-grooves for storing a plurality of optical fibers.

* * * * *